United States Patent
Billiani et al.

(10) Patent No.: US 9,758,691 B2
(45) Date of Patent: Sep. 12, 2017

(54) AQUEOUS COATING COMPOSITIONS

(71) Applicant: Allnex Austria GmbH, Werndorf (AT)

(72) Inventors: Johann Billiani, Graz (AT); Gottfried Furpass, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 260 days.

(21) Appl. No.: 14/346,059

(22) PCT Filed: Sep. 30, 2012

(86) PCT No.: PCT/EP2012/069301
§ 371 (c)(1),
(2) Date: Mar. 20, 2014

(87) PCT Pub. No.: WO2013/045686
PCT Pub. Date: Apr. 4, 2013

(65) Prior Publication Data
US 2014/0243469 A1    Aug. 28, 2014

(30) Foreign Application Priority Data
Sep. 30, 2011    (EP) .................... 11183596

(51) Int. Cl.
C09D 133/06    (2006.01)
(52) U.S. Cl.
CPC .............. *C09D 133/066* (2013.01)
(58) Field of Classification Search
CPC ................................ C09D 133/066
USPC ................................ 524/555, 558
See application file for complete search history.

(56) References Cited

U.S. PATENT DOCUMENTS

| 4,045,399 A | 8/1977 | Suzuki et al. |
| 6,025,449 A * | 2/2000 | Enomoto ............. C08F 220/18 |
| | | 524/558 |
| 2007/0225442 A1 | 9/2007 | Ootuka et al. |

FOREIGN PATENT DOCUMENTS

| EP | 1 754 766 | 2/2007 |
| EP | 2 412 739 | 2/2012 |
| GB | 2 322 863 | 9/1998 |
| JP | 49-109426 | 10/1974 |
| JP | 11-131016 | 5/1999 |
| JP | 2004-002749 | 1/2004 |
| JP | 2005-179614 | 7/2005 |
| JP | 2010-248465 | 11/2010 |

OTHER PUBLICATIONS

International Search Report issued in International (PCT) Application No. PCT/EP2012/069301.
Notice of Reasons for Refusal dated Mar. 31, 2016 in corresponding Japanese Application No. 2014-532426, with machine translation.

* cited by examiner

*Primary Examiner* — Edward Cain
(74) *Attorney, Agent, or Firm* — Wenderoth, Lind & Ponack, L.L.P.

(57) ABSTRACT

The invention relates to an aqueous coating composition comprising a dispersion of an acrylic copolymer A, a crosslinker B which is a multifunctional isocyanate B1, or an aminoplast crosslinker B2 or a combination of both B1 and B2, and water, wherein the acrylic copolymer A has moieties derived from alkyl(meth)acrylates A1, from hydroxyalkyl (meth)acrylates A2, from olefinically unsaturated carboxylic acids A3, and optionally, further olefinically unsaturated monomers A4 selected from the group consisting of vinyl aromatics A41, vinyl esters A42, vinyl halogenides A43, olefinically unsaturated amides A44, olefins A45, vinyl ester A46, and from an olefinically unsaturated surface-active compound A5 which has at least one olefinic unsaturation, and at least one hydrophilic group per molecule, a method for its preparation, and the use thereof in coating metal substrates, stone, concrete, paper and cardboard.

21 Claims, No Drawings

AQUEOUS COATING COMPOSITIONS

FIELD OF THE INVENTION

The invention relates to aqueous coating compositions, to a process for their preparation, and to a method of use thereof in coating of substrates.

BACKGROUND OF THE INVENTION

In the patent EP 1 754 766 B1, an aqueous resin for dispersion adhesives is disclosed which comprises two polymers, whereof the first polymer having a glass transition temperature of from 0° C. to 60° C. is obtained by emulsion polymerisation of a monomer composition comprising a mass fraction of from 80% to 99.99% of at least one monomer selected from the group consisting of aromatic vinyl monomers and (meth)acrylate monomers which are esters of hydroxy-functional compounds and acrylic or methacrylic acid, a mass fraction of up to 1% of crosslinkable monomers, and a mass fraction of up to 19.99% of different monomers which may also comprise hydroxy-functional vinyl monomers, and the second polymer having a glass transition temperature of from −40° C. to 20° C. is obtained by emulsion polymerisation of a monomer composition comprising a mass fraction of from 80% to 99.4% of at least one monomer selected from the group consisting of aromatic vinyl monomers and (meth)acrylate monomers which are esters of hydroxy-functional compounds and acrylic or methacrylic acid, a mass fraction of from 0.5% to 5% of hydroxy-functional vinyl monomers, a mass fraction of from 0.1% to 5% of olefinically unsaturated carboxylic acid monomer, and a mass fraction of up to 19% of any other monomer.

In the patent application JP Sho 49-109 426 A, water-based thermosetting coating compositions are described which comprise a copolymer made from a polyalkylene glycol acrylate, an olefinically unsaturated carboxylic acid, and further vinyl monomers, and an aminoplast crosslinker.

In the Japanese patent application 2010-284 465 A, a powdery acrylic pressure-sensitive adhesive composition is disclosed which contains acrylic emulsion copolymer particles, and a crosslinking agent in an aqueous medium. The mass fraction of hydroxy-functional monomers in the monomer mixture is from 0.01% to 5%.

In the Japanese patent application 2005-179 614 A, an aqueous copolymer emulsion is described made from an unsaturated hydroxy-functional vinyl monomer, and other copolymerisable (meth)acrylic monomers. The mass fraction of hydroxy-functional monomers in the monomer mixture is between 5.6% and 5.7% (working example 1, preparations (a) and (a')), and the mass fraction of alkyl(meth)acrylates in these preparations is between 89.5% and 89.6%.

Two-pack coating compositions based on solvent-borne acrylic resins have been used widely in the coatings industry, particularly in coating of substrates that are not to be exposed to high temperature for curing, such as automotive refinish paints. Multifunctional isocyanates are mostly used as curing agents for these hydroxy-functional resins. As there is a trend to replace solvent-borne coating compositions by water-borne, or aqueous, coating compositions to reduce the emission of solvents during film formation and drying, a transition is seen towards aqueous systems. Isocyanates are well-known to be prone to react with water under formation of carbon dioxide, therefore, small bubbles can be formed in such aqueous coating compositions which are particularly visible in coating layers of higher thickness, such as 50 μm or more.

It is therefore an object of the invention to provide aqueous coating compositions based on hydroxy-functional acrylic copolymer dispersions and curing agents therefor, with a reduced propensity to formation of bubbles.

In thicker layers, sagging is also frequently observed. Such sagging can be controlled by addition of thickeners or rheology additives. Rheology additives based on finely dispersed silica, for example, reduce the propensity to sagging, but show varying degree of gloss reduction in dependence of the coating layer thickness. Low gloss, or matt coatings have recently met with increased demand. While addition of matting agents such as finely dispersed silica leads to coating films with reduced gloss, it has, however, been observed that the reduction of gloss is dependent on the coating layer thickness, apparently due to the higher number of scattering particles in a thicker layer. A coating composition is therefore needed that does not exhibit these shortcomings of the presently available systems.

In the experiments underlying the present invention, it has been found that a coating composition comprising a dispersion of a hydroxy-functional acrylic copolymer having emulsifiers chemically attached to the polymer chain, and a curing agent which is preferably based on multifunctional isocyanates, provides a coating film which is essentially free from bubbles up to coating layer thickness of 200 μm, has a low propensity to sagging, and has a reduced gloss which is independent on the thickness of the coating film. The emulsifiers which can be used in the present invention have at least one carbon-carbon double bond which is copolymerisable with the olefinically unsaturated monomers on which the hydroxy-functional acrylic copolymer is based.

SUMMARY OF THE INVENTION

The invention relates to an aqueous coating composition comprising a dispersion of a hydroxy-functional acrylic copolymer A, a crosslinker B which is preferably a multifunctional isocyanate B1, or an aminoplast crosslinker B2 or a combination of both B1 and B2, and water, wherein the hydroxy-functional acrylic copolymer A has moieties derived from the following co-monomers: from alkyl (meth)acrylates A1, from hydroxyalkyl (meth)acrylates A2, from olefinically unsaturated acids A3, and optionally, further olefinically unsaturated monomers A4 selected from the group consisting of vinyl aromatics A41, vinyl ethers A42, vinyl halogenides A43, olefinically unsaturated amides A44, olefins A45, vinyl esters A46, and from a surface-active compound A5 which acts as emulsifier, and has at least one olefinic unsaturation, and at least one hydrophilic group.

This hydrophilic group may be a non-ionic moiety, preferably an oligoalkylene ether or polyalkylene ether having ethylene or propylene or both moieties as alkylene groups, or an ionic moiety which is preferably an acid group or a salt group derived from an organically bound carboxylic, sulphonic or phosphonic acid, or a combination of non-ionic and ionic hydrophilic moiety. This latter possibility may be achieved by an olefinically unsaturated compound that has two kinds of hydrophilic groups, viz., both at least one non-ionic moiety and at least one ionic moiety, as described supra, or a mixture of at least two different olefinically unsaturated compounds, at least one compound having at least one non-ionic moiety, and at least one compound having at least one ionic moiety, as described supra.

DETAILED DESCRIPTION OF THE PREFERRED EMBODIMENTS

The hydroxy-functional acrylic A copolymer preferably has a hydroxyl number of at least 70 mg/g, more preferably from 80 mg/g to 250 mg/g, and particularly preferably, from 100 mg/g to 200 mg/g. Especially good results have been obtained if the hydroxy-functional acrylic copolymer has a hydroxyl number of at least 120 mg/g.

It is preferably made by radically induced copolymerisation of the monomers of groups A1, A2, A3, and A5, optionally in the presence of at least one monomer of group A4. This copolymerisation is preferably conducted as an emulsion copolymerisation, wherein the monomers are provided in the form of an aqueous emulsion. The monomers A5 act as emulsifiers; it is, however, also possible to add further surfactants which do not possess an olefinic unsaturation in their molecules. Preferably, at least 20% of the mass of emulsifiers used in the preparation of the acrylic copolymer dispersions have at least one olefinic unsaturation in their molecules, particularly this mass fraction is at least 40%, and with special preference, at least 50%.

Preferred monomers of group A1 are esters of acrylic or methacrylic acid with linear, branched or cyclic aliphatic alcohols having from one to thirty carbon atoms, preferably being selected from the group consisting of methanol, ethanol, n-propanol, isopropanol, n-butanol, sec. butanol, iso-butanol, and tert.-butanol, the isomeric amyl alcohols, 1-hexanol, 2-hexanol, 1-heptanol, 1-octanol, 2-ethyl-1-hexanol, stearylalcohol, cyclohexanol, 2-methyl-cyclohexanol, borneol, and isoborneol. Further monomers of this group include the esters of the said alcohols with ethacrylic acid, and vinylacetic acid, crotonic acid, and isocrotonic acid, as well as maleic, fumaric, itaconic, mesaconic and citraconic acids.

Preferred monomers of group A2 are monoesters of dihydric aliphatic linear or branched or cyclic alcohols having from two to twenty carbon atoms, with acrylic or methacrylic acid, ethacrylic acid, and vinylacetic acid, crotonic acid, and isocrotonic acid, as well as maleic, fumaric, itaconic, mesaconic and citraconic acids. Particularly preferred are hydroxyethyl (meth)acrylate, and 1,2- and 1,3-hydroxypropyl (meth)acrylate.

Preferred monomers of group A3 are olefinically unsaturated acids having from three to twelve carbon atoms, at least one olefinic unsaturation and at least one acid group which is selected from the group consisting of carboxylic acid groups, and acid groups derived from sulphur and phosphorus, preferably olefinically unsaturated carboxylic acids having at least one olefinic unsaturation and at least one carboxylic acid group, and from three to twelve carbon atoms. Particularly preferred are acrylic or methacrylic acid, ethacrylic acid, and vinylacetic acid, crotonic acid, and isocrotonic acid, as well as maleic, fumaric, itaconic, mesaconic and citraconic acids, and half esters of maleic, fumaric, itaconic, mesaconic and citraconic acids with linear, branched or cyclic aliphatic alcohols having from one to thirty carbon atoms, preferably being selected from the group consisting of methanol, ethanol, n-propanol, isopropanol, n-butanol, sec. butanol, iso-butanol, and tert.-butanol, the isomeric amyl alcohols, 1-hexanol, 2-hexanol, 1-heptanol, 1-octanol, 2-ethyl-1-hexanol, stearylalcohol, cyclohexanol, 2-methyl-cyclohexanol, borneol, and isoborneol. Further olefinically unsaturated acid functional monomers useful for the invention are olefinically unsaturated sulponic, sulphuric, phosphonic, phosphoric, phosphinic, and phosphorous acids. Sulphonic or sulphonate groups can be covalently introduced into a hydroxy-functional acrylic copolymer by copolymerisation of olefinically unsaturated compounds comprising sulphonic acid and/or sulphonate groups. Examples of suitable monomers are monomers represented by the formula:

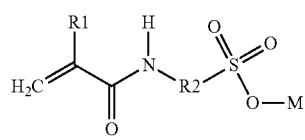

wherein R1 is a hydrogen, a $C_1$- to $C_{20}$-monovalent hydrocarbon radical, or a halogen; R2 is a $C_1$- to $C_{20}$-divalent saturated hydrocarbon, optionally branched or substituted, and M is a hydrogen, alkali metal, or optionally substituted ammonium. Preferred sulphonic group-containing monomers are 2-acrylamido-2-methyl propane sulphonic acid and its amine or ammonium salts, preferably the salts obtained by neutralisation with tertiary amines. Other examples of suitable sulphonic acid- or sulphonate-functional unsaturated monomers include styrene sulphonic acid, ethylene sulphonic acid, 2-sulphoethyl methacrylate, and their salts. Alternatively, sulphonate groups can be introduced into acrylic polyols by reaction of alkali metal salts of taurine or adducts thereof with mono-epoxy compounds, e.g., the glycidyl ester of branched monocarboxylic acids, and epoxy-functional monomers, e. g., glycidyl methacrylate, prior to, during or after the formation of the acrylic polyol. Similarly, alkali metal salts of 3-cyclohexylamino-1-propane sulphonic acid can be introduced. Other examples of copolymerisable unsaturated compounds suitable for the covalent introduction of sulphonic acid or sulphonate groups into acrylic polyols are the reaction products of free radical-polymerisable monomers comprising an isocyanate group and sulphonic acids or sulphonates comprising at least one isocyanate reactive group. Examples of such free radical-polymerisable monomers are α,α-dimethyl m-isopropenyl benzyl isocyanate and isocyanatoethyl methacrylate. Examples of suitable sulphonic acids or sulphonates having at least one isocyanate reactive group are 2-hydroxyethyl sulphonic acid and its salts, alkali metal taurinates, alkali metal N-alkyl taurinates, and the reaction products of mono-epoxy compounds with alkali metal taurinates, 3-cyclohexylamino-1-propane sulphonic acid, and its alkali metal salts.

Preferred monomers of group A41 are styrene, alpha-methyl styrene, 4-methyl styrene, the mixture of methyl styrene commercially available as "vinyl toluene", p-methoxystyrene, p-ethoxystyrene, 2-vinylpyridine, 4-vinylpyridine, 4-vinyl biphenyl, 2-vinylnaphthalene, and 9-vinylanthracene. By "(meth)acryl", either of both of methacryl and acryl are meant.

Preferred monomers of group A42 are vinyl methyl ether, vinyl ethyl ether, n-butyl vinyl ether, vinyl 2-ethylhexyl ether, octadecyl vinyl ether, and cyclohexyl vinyl ether.

Preferred monomers of group A43 are vinyl chloride, acrylonitrile and methacrylonitrile.

Preferred monomers of group A44 are acrylamide, methacrylamide, homologues of these such as N-methyl (meth) acrylamide, N-methyl (meth)acrylamide, etc., N-vinyl-N-methyl acetamide, N-vinyl-N-methyl formamide, N-vinyl-N-methyl propionamide, N-vinyl-N-methyl butyramide, N-vinyl-N-methyl isobutyramide, and the corresponding homologues having ethyl, n- and iso-propyl, n-butyl and tert.-butyl substituents on the nitrogen atom, as well as amide-functional derivatives of olefinically unsaturated carboxylic acids such as (meth-) acryloyloxyalkyl alkylene ureas, particularly preferably (meth)acryloyloxyethyl ethylene urea.

Preferred monomers of group A45 are ethylene, propylene, butene-1, hexene-1, and octene-1, and dienes such as butadiene, isoprene, and chloroprene.

Preferred monomers of group A46 are vinyl acetate, vinyl propionate, vinyl laurate, vinyl stearate and the vinyl esters of branched aliphatic carboxylic acids having from five to twelve carbon atoms which latter are preferably vinyl pivalate, vinyl neononanoate, and vinyl neodecanoate.

At least one copolymerisable emulsifier A5 is used in the preparation of the acrylic copolymer A. This emulsifier A5 has at least one olefinic unsaturation per molecule, preferably a vinyl or an allyl group, and at least one moiety that is hydrophilic, which may be either a non-ionic moiety which is an oligoalkylene ether or polyalkylene ether having ethylene or propylene or both moieties as alkylene groups, or an ionic moiety which is preferably a salt group derived from an organically bound carboxylic, sulphonic or phosphonic acid group, or a combination of non-ionic and ionic hydrophilic moiety.

Preferred copolymerisable emulsifiers of group A5 have the structure:

wherein $R^1$ is an olefinically unsaturated aliphatic group having from two to ten carbon atoms, preferably selected from the group consisting of $CH_2$=CH—, $CH_3$—CH=CH—, $CH_2$=C($CH_3$)—, and $CH_2$=CH—$CH_2$—, and $R^2$ is a radical comprising at least one oxyethylene or oxypropylene unit, or at least one acid or acid salt group.

Preferably, $R^2$ is —$C_6H_3(R^3)$—(O—$CH_2$—$CH_2$)$_n$—$R^4$, —O—$CH_2$—CH($CH_2$—O—$C_6H_4$—$R^3$)—(O—$CH_2$—$CH_2$)$_n$—$R^4$, —(O—$CH_2$—$CH_2$)$_n$—$R^4$, —(O—$CH_2$—CH($CH_3$))$_n$—$R^4$, —(O—$CH_2$—$CH_2$)$_m$—(O—$CH_2$—CH($CH_3$))$_n$—$R^4$ or —(O—CH2-CH($CH_3$))$_m$(O—$CH_2$—$CH_2$)$_n$—$R^4$, or —$R^5$—$R^{4'}$, $R^3$ is a linear, branched or cyclic alkyl group;

$R^4$ is hydroxyl group or a polar group such as carboxylate (—$CO_2M$), sulphonate (—$SO_3M$), sulphate (—$SO_4M$), phosphonate (—$PO_3M$) or phosphate (—$PO_4M$);

$R^{4'}$ is an acid or acid salt group selected from the group consisting of carboxylate (—$CO_2M$), sulphonate (—$SO_3M$), sulphate (—$SO_4M$), phosphonate (—$PO_3M$) or phosphate (—$PO_4M$), $R^5$ is direct bond or an alkylene group of from one to twelve carbon atoms, or an arylene group of from six to eighteen carbon atoms, and M is $H^+$, $Na^+$, $NH_4^+$, $K^+$ or $Li^+$.

Preferably, $R^4$ is a hydroxyl group or (—$PO_4M$), n is from 5 to 100; and m is from 0 to 100. Further preferably, $R^3$ is a linear, branched or cyclic alkyl group having from seven to thirteen carbon atoms such as methylcyclohexyl, 2-ethylhexyl, and nonyl $C_9H_{19}$—, and n is from 5 to 40.

The oxyethylene and oxypropylene moieties may be present as blocks, as stated in the formulae supra, or may form a random copolymer.

Using copolymerisable emulsifiers A5 leads to the unexpected finding that two-pack coating compositions formulated with unblocked isocyanates exhibit a matt effect after curing, which effect is not dependent on the layer thickness of the coating film. It has to be noted that the acrylic copolymer itself, without addition of the unblocked isocyanate crosslinker, regardless of the presence of the copolymerisable emulsifier A5 in the monomer mixture used for its synthesis, forms a clear film upon drying. The matt effect has been found not to depend on the curing conditions for the same acrylic copolymer and crosslinker combination, the same degree of haze is obtained by room temperature cure (23° C.) and accelerated curing conditions at 150° C. for twenty minutes. Particularly good results are obtained if the monomers A5 comprise a mixture of purely aliphatic and of mixed aromatic-aliphatic compounds.

Good results have been obtained in the experiments underlying this invention if the optionally used monomer A4 is present in the polymerisation process leading to the acrylic copolymer A.

Particularly good results are obtained if more than one of the monomers A1 through A5 are selected from the preferred groups of these monomers as detailed supra. Thus, choosing monomers A1 and A2, or A1 and A3, or A1 and A4, or A1, and A5, or A2 and A3, or A2 and A4, or A2 and A5, or A3 and A4, or A3 and A5, or A4 and A5, from the preferred groups, has led to improved results in the experiments underlying this invention. Further improved results have been obtained if three of the monomers A1 through A5 are selected from the preferred groups of these monomers as detailed supra, i. e. choosing monomers A1 and A2 and A3, or A1 and A2 and A4, or A1 and A2 and A5, or A2 and A3 and A4, or A2 and A4 and A5, or A3 and A4 and A5, from the preferred groups. Still further improved results have been obtained if four of the monomers A1 through A5 are selected from the preferred groups of these monomers as detailed supra, i. e. choosing monomers A1 and A2 and A3 and A4, or A1 and A2 and A3 and A5, or A2 and A3 and A4 and A5, from the preferred groups. The best results in such combination were obtained if all five of the monomers A1 through A5 are selected from the preferred groups of these monomers as detailed supra, i. e. choosing monomers A1 and A2 and A3 and A4 and A5, from the preferred groups. Even better improvements were found when the monomers A1 through A5 are selected from the preferred individual compounds as named supra, in combinations as listed hereinabove for the groups of compounds.

The acrylic copolymer A is dispersed in water, optionally with the aid of additional emulsifiers as known in the art, which may preferably be anionic or non-ionic emulsifiers, or mixtures of both. An anionic emulsifier has an anionic group or anionogenic group bound to an organic group, "anionogenic" meaning a group that dissociates in an aqueous or other dielectric medium to form an organically bound anion, and a cation which may preferably be a proton or a cation derived from an alkali metal or ammonium.

The multifunctional isocyanate B1 has, on average, at least two isocyanate groups per molecule. It is preferred to use a mixture of a multifunctional isocyanate B11 that is hydrophilically modified, and a second multifunctional isocyanate B12 which does not have hydrophilic modification. Multifunctional, in the context of this invention, means "having a functionality of at least more than one" and thus includes difunctional and polyfunctional chemical entities, polyfunctional meaning "having a functionality of at least more than two". The hydrophilic multifunctional isocyanate B11 is preferably made by reaction of a polyfunctional isocyanate that has at least three isocyanate groups per molecule, and a mono-hydroxy functional oligoalkylene ether or polyalkylene ether having ethylene or propylene or both moieties as alkylene groups, or a mono-hydroxy functional derivative of such oligo- or polyalkylene ether.

The aminoplast crosslinker B2 is derived from an aminoplast former such as melamine, a guanamine, urea, cyclic alkylene urea, and derivatives of these, an aliphatic aldehyde or an aliphatic multifunctional aldehyde, or mixtures of these, preferably formaldehyde, the reaction product of aminoplast former and aldehyde preferably being etherified with aliphatic alcohols having preferably from one to four carbon atoms. Particularly preferred for water-borne coating compositions are adducts from melamine and formaldehyde which have been etherified with methanol, such as hexa (methoxymethyl) melamine.

The mass fractions of moieties derived from monomers A1 through A5 in the acrylic copolymer A are preferably:

for A1, from 20% to 70%, particularly preferably, from 25% to 65%, and most preferred, from 30% to 60%;

for A2, from 15% to 70%, particularly preferably, from 20% to 65%, and most preferred, from 30% to 60%;

for A3, from 1.0% to 8.0%, particularly preferably, from 1.1% to 7.8%, and most preferred, from 1.2% to 7.6%;

for A4, from 0% to 25%, particularly preferably, from 0.1% to 15%, and most preferred, from 0.5% to 10%;

for A5, from 0.1% to 10%, particularly preferably, from 0.5% to 6%, and most preferred, from 1% to 5%.

A moiety in a copolymer is regarded as being derived from an olefinically unsaturated monomer having at least one olefinic unsaturation of the type $>C^a=C^b<$ if the difference between the moiety under consideration and the monomer under consideration is at least one additional substituent on at least one of carbon atoms $C^a$ and $C^b$ which may be a hydrogen atom, or a polymeric chain, or a radical stemming from the radical initiator, or a radical stemming from a compound acting as a chain transfer agent.

The acrylic copolymer is preferably made by emulsion polymerisation where water is charged to a reaction vessel, optionally, a mixture of water and at least one copolymerisable surfactant A5 is added, optionally together with a non-copolymerisable surfactant, and the resulting mixture homogenised. The mixture is then heated to from 60° C. to 95° C., a monomer emulsion is prepared by intimately mixing water, at least one copolymerisable surfactant A5, optionally together with a non-copolymerisable surfactant, and the mixture of monomers A1 through A4 is added and the resulting mixture is homogenised. A portion of from 1% to 5% of this monomer emulsion is added to the reaction vessel, together with a first portion of the radical initiator, in this case, a peroxo salt such as potassium peroxodisulphate. After the exotherm has faded, the residual monomer emulsion is slowly fed to the reaction vessel while keeping the reaction temperature at the rated value. After the feed has ended, the mixture is held under stirring, and further initiator is added to complete the conversion. The reaction mixture is then cooled, and neutralised with an amine, preferably dimethylethanolamine. Finally, a biocide is added. The dispersion is then filtered through a sieve having a mesh size of from 50 µm to 100 µm.

The dispersion of the acrylic copolymer A has preferably a particle size of from 70 nm to 250 nm.

Coating compositions are formulated with these dispersions by adding a crosslinking agent which is reactive with the hydroxyl groups of the resin dispersion. One pack compositions are made by addition of hydrophilic aminoplast crosslinkers such as melamine-formaldehyde resins which are etherified with lower alcohols such as methanol, or blocked or capped isocyanate crosslinkers.

In combination with unblocked isocyanate crosslinkers, two-pack coating compositions can be obtained which surprisingly do not show bubble formation even when applied in thick layers up to 200 µm.

Another unexpected advantage is the matt appearance of clear coating compositions, without the usual matting additives. This matt effect is independent of the layer thickness, while commonly, addition of matting agents like disperse silica exhibits a variation of matt effect with the layer thickness.

The coating compositions of the present invention are particularly useful as topcoats which have a uniform matt appearance. Two-pack topcoats can be used in automotive refinishing, automotive OEM coating, in household goods, electric and electronic appliances, on metal substrates or in multi-layer coatings, on mineral substrates such as stone and concrete, but also on wood, paper, and cardboard and other substrates sensitive to heat.

The following examples serve to further explain the invention, without intention to be limiting.

EXAMPLES

In these examples, as well as in the rest of the specification, the following definitions are used:

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

"Strength" of a solution or dispersion is the mass fraction $w_S$ of solute or dispersed substance S, calculated as the ratio of the mass $m_S$ of the substance S, and the mass of the solution or dispersion which is the sum of the mass $m_D$ of solvent or dispersant D, and the sum of the masses $m_{\Sigma Si}$ of all dissolved or dispersed substances $S_i$, i denoting an integer which is an index ranging from 1 to the number of all dissolved or dispersed substances $S_i$ in the dispersion or solution under consideration.

Molar mass of the acrylic copolymers has been determined in the usual way using a gel permeation chromatography system, also referred to as size exclusion chromatography, calibrated with polystyrene standard samples. Particle size was measured as median of a distribution determined by photon correlation spectroscopy using a Malvern Autosizer, according to DIN ISO 13321. Dynamic viscosity was measured at 23° C. and a shear rate of 25 s$^{-1}$, in a cone and plate viscosimeter, according to DIN EN ISO 3219. The minimum film formation temperature was determined according to DIN ISO 2115.

Example 1

Synthesis of an Acrylic Copolymer 5 kg of deionised water were charged into a reaction vessel, and heated to 85° C. An initiator solution was prepared by dissolving 35 g of ammonium peroxodisulphate in 4 kg of water. A surfactant solution was prepared by adding to 3 kg of water, 800 g of a 35% strength aqueous solution of poly(oxy-1,2-ethanediyl), α-sulpho-ω-[1-[(nonylphenoxy) methyl]-2-(2-propen-1-yloxy) ethoxy]-, mixed with its ammonium salt in equimolar ratio (CAS ref. 113405-85-9), and 120 g of a 50% strength aqueous solution of eikosa(oxy-1,2-ethanediyl), α-sulpho-ω-[1-allyloxy-3-alkoxy-propen-2-yl]- where the alkyl groups are mixtures derived from fatty alcohol mixtures having from thirteen to twenty carbon atoms in the alkyl groups. A monomer mixture was prepared from 3.5 kg of hydroxyethyl methacrylate, 1.77 kg of methyl methacrylate, 850 g of styrene, 380 g of methacrylic acid, and 3.5 kg of n-butyl acrylate. The monomer mixture was emulsified in 80% of the mass of the aqueous surfactant solution, the residual surfactant solution was added to the reaction vessel together with 5% of the mass of the monomer emulsion. The mixture was stirred and heated to 75° C. After reaching this temperature, the initiator solution was added, and stirred for ten minutes while a slightly exothermic reaction was noticed. The rest of the monomer emulsion was then added over a period of three hours at this temperature, and the vessel was kept under stirring at this temperature for sixty minutes after complete addition of the monomers. The reaction mixture was then cooled to 30° C., neutralised by addition of 60 g of dimethylethanolamine, and filtered through a sieve having a mesh size of 80 µm.

The resulting dispersion had a mass fraction of solids of 43.3%, a dynamic viscosity of 1031 mPa·s, a median of the particle size of 124 nm, and a pH of 7.3.

Example 2

Aqueous Clear Coating Composition 1

A mixture was prepared from 8.5 kg of the acrylic copolymer dispersion of Example 1, 20 g of a flow and levelling additive (an acid and hydroxy functional acrylic copolymer having an acid number of 80 mg/g, a hydroxyl number of 58 mg/g, and a molar mass of 25 kg/mol, with a mass fraction of solids of 50%), 60 g of a wetting additive (a polyether-modified hepta-methyltrisiloxane surfactant having a mass fraction of solids of 50%), and 1.42 kg of deionised water. The mixture was homogenised with a Cowles dissolver for ten minutes at 600 min$^{-1}$. The resulting homogeneous mixture was deaerated by letting rest for twenty-four hours at ambient temperature and pressure (23° C., 1013 hPa).

1.63 kg of a multifunctional isocyanate crosslinker (hexamethylene diisocyanate trimer, no solvent added, with a mass fraction of isocyanate groups, —N=C=O, of 23%), 1.1 kg of a hydrophilically modified multifunctional isocyanate crosslinker (based on hexamethylene diisocyanate, no solvent added, having a mass fraction of isocyanate groups, —N=C=O, of 17.4%), and 1.17 kg of 2-butoxyethyl acetate were mixed for two minutes by manual stirring.

This isocyanate solution was fed in portions during five minutes into the stirred acrylic dispersion mixture. By addition of further 0.9 kg of water, the resulting coating composition was adjusted to an efflux time of 20 s from a DIN 4 cup. After letting rest for deaeration for fifteen minutes, the coating composition was ready for application.

Example 3

Synthesis of a Comparative Acrylic Copolymer

An aqueous surfactant solution was prepared by mixing 7 kg of water, 350 g of an aqueous solution of a fatty alcohol ether sulphate in the form of its sodium salt, having a mass fraction of solids of 27%, and a pH of 7, and 100 g of an aqueous solution of a mixture of ethoxylated linear fatty alcohols with a mass fraction of solids of 80%, and a turbidity temperature "cloud point" of 63° C., measured on a solution of 1% strength in an aqueous sodium chloride solution of 10% strength.

4 kg of deionised water were charged into a reaction vessel, and 25% of the mass of the surfactant solution thus prepared was added to the water under stirring at 150 min$^{-1}$. In another vessel, the residual 75% of the mass of the surfactant solution was used to emulsify a monomer mixture of 3.3 kg of hydroxyethyl methacrylate, 1.8 kg of methyl methacrylate, 1 kg of styrene, 250 g of methacrylic acid, and 3.65 kg of butyl acrylate. A mass fraction of 3% of this monomer pre-emulsion mixture was added to a reactor, together with 30 g of ammonium peroxodisulphate, the rise in temperature was limited to 85° C. by cooling. When the exothermic heating had ceased, the reaction mixture was held for five further minutes under stirring whereafter the rest of the monomer pre-emulsion was added over three hours at the set temperature of 85° C. After the addition was complete, the reaction mixture was held for thirty further minutes at 85° C., and then 5 g of ammonium peroxodisulphate dissolved in 500 g of water were added to complete the conversion during one additional hour of stirring at 85° C. The reaction mixture was then cooled to 40° C., and 53.5 g of dimethylethanolamine were added to set the pH to 8.25 g of an aqueous biocide solution based on a mixture of 2-methyl-3(2H)-isothiazolinone (mass fraction of 0.37% in the solution) and 5-chloro-2-methyl-3(2H)-isothiazolinone were the added.

The resulting dispersion had a mass fraction of solids of 45.3%, a dynamic viscosity of 188 mPa·s, a median of the particle size of 116 nm, and a pH of 7.9. Its minimum film forming temperature was 10° C.

Example 4

Comparative Aqueous Clear Coating Composition 2

A mixture was prepared from 8.5 kg of the acrylic copolymer dispersion of Example 3, 20 g of a flow and levelling additive (an acid and hydroxy functional acrylic copolymer having an acid number of 80 mg/g, a hydroxyl number of 58 mg/g, and a molar mass of 25 kg/mol, with a mass fraction of solids of 50%), 60 g of a wetting additive (a polyether-modified hepta-methyltrisiloxane surfactant having a mass fraction of solids of 50%), and 1.42 kg of deionised water. The mixture was homogenised with a Cowles dissolver for ten minutes at 600 min$^{-1}$. The resulting homogeneous mixture was deaerated by letting rest for twenty-four hours at ambient temperature and pressure (23° C., 1013 hPa).

1.63 kg of a multifunctional isocyanate crosslinker (hexamethylene diisocyanate trimer, no solvent added, with a mass fraction of isocyanate groups, —N=C=O, of 23%), 1.1 kg of a hydrophilically modified multifunctional isocyanate crosslinker (based on hexamethylene diisocyanate, no solvent added, having a mass fraction of isocyanate groups, —N=C=O, of 17.4%), and 1.17 kg of 2-butoxyethyl acetate were mixed for two minutes by manual stirring.

This isocyanate solution was fed in portions during five minutes into the stirred acrylic dispersion mixture. By addition of further 1.08 kg of water, the resulting coating composition was adjusted to an efflux time of 20 s from a DIN 4 cup. After letting rest for deaeration for fifteen minutes, the coating composition was ready for application.

Example 5

Comparative Solvent-Borne Clear Coating Composition

A hydroxy-functional solvent borne acrylic copolymer solution was prepared in accordance with DE 26 26 900 C2, Example 1. This acrylic copolymer resin had a hydroxyl number of 149 mg/g, and an acid number of 7.5 mg/g, and is dissolved in a mixture of xylene, butyl acetate, and solvent naphtha ("Solvesso™ 100 fluid", a low boiling temperature naptha fraction having a boiling temperature range of from 164° C. to 180° C.). 8.05 kg of this acrylic resin solution were further diluted with additional 1.21 kg of butyl acetate, 20 g of a flow and levelling additive (polyether-modified polydimethyl siloxane dissolved in 2-ethyl hexanol), and 720 g of a silica matting agent having a median of the particle size of 10 μm. This mixture was homogenised at a stirring speed of 600 min$^{-1}$ for two minutes to form component 5a. In a separate vessel, 3.25 kg of a 75% strength solution of a hexamethylene diisocyanate based biuret in butyl acetate having a mass fraction of isocyanate groups, —N=C=O, of 16.5%, and 810 g of further butyl acetate were mixed to form component 5b, and both components 5a and 5b were mixed by adding 5b in portions to 5a under stirring at 600 min$^{-1}$ for five minutes. By addition of 3.4 kg of butyl acetate, the efflux time of the resulting coating composition was adjusted to 20 s from a DIN 4 cup.

Example 6

Application and Testing

The clear coating compositions of examples 2, 4 and 5 were sprayed with a spray gun having a nozzle of 1.4 mm diameter and a spraying pressure of 0.4 MPa (4 bar) each on three vertically positioned anodically oxidised aluminium panels a, b, and c, each having a width of 200 mm and a height of 500 mm. Coating films with continuously increasing film thickness were obtained by increasing the number of horizontal moves along the panels from top to bottom without allowing a flash-off between the individual coats, to lead to dry film thickness increasing from 40 μm to 110 μm.

The panels coated with the solvent borne paint (example 5) were dried
  for seven days at room temperature (65 a),
  for thirty minutes at room temperature (flash-off), and then for thirty minutes at 80° C., followed by seven days at room temperature (65 b), and
  for thirty minutes at room temperature (flash-off), and then for twenty minutes at 150° C., followed by seven days at room temperature (65 c).

The panels coated with the water borne paints (examples 2 and 4) were dried
  for seven days at room temperature (62 a, 64 a),
  for thirty minutes at room temperature (flash-off), and then for thirty minutes at 80° C., followed by seven days at room temperature (62 b, 64 b), and
  for thirty minutes at room temperature (flash-off), and then for twenty minutes at 150° C., followed by seven days at room temperature (62 c, 64 c).

After resting for seven days, all panels were inspected for gloss (measured at an angle of 60°) using a commercial gloss meter ("Micro-Tri-Gloss®", BYK-Gardner GmbH, Geretsried). Dry film thickness was measured using a "Dualscope® MPO" (Helmut Fischer GmbH, Sindel-fingen). The following table 1 lists the values obtained:

TABLE 1

| | | | 60° Gloss (average and standard deviation) for different film thickness | | | | |
|---|---|---|---|---|---|---|---|
| Coating Composition of Example | Drying temperature and time T/° C.\|t/min | Dry film Thickness in μm Paint | | 50 μm | 65 μm | 80 μm | 100 μm |
| 5 | — | 65 a | | 8.47 ± 0.06 | 8.80 ± 0.17 | 9.63 ± 0.06 | 10.73 ± 0.02 |
| | 80° C.\|30 | 65 b | | 6.47 ± 0.06 | 7.80 ± 0.17 | 8.90 ± 0.10 | 9.90 ± 0.17 |
| | 150° C.\|20 | 65 c | | 8.63 ± 0.06 | 9.67 ± 0.23 | 11.17 ± 0.15 | 13.93 ± 0.6 |
| 2 | — | 62 a | | 9.33 ± 0.25 | 9.77 ± 0.15 | 10.23 ± 0.06 | 10.47 ± 0.12 |
| | 80° C.\|30 | 62 b | | 9.23 ± 0.06 | 9.67 ± 0.12 | 9.97 ± 0.12 | 10.43 ± 0.06 |
| | 150° C.\|20 | 62 c | | 9.23 ± 0.12 | 9.63 ± 0.06 | 10.23 ± 0.21 | 10.57 ± 0.15 |
| 4 | — | 64 a | | 23.8 ± 0.5 | 26.0 ± 0.3 | 26.4 ± 0.5 | 29.73 ± 0.21 |
| | 80° C.\|30 | 64 b | | 21.03 ± 0.12 | 23.9 ± 0.3 | 26.70 ± 0.10 | 24.93 ± 0.15 |
| | 150° C.\|20 | 64 c | | 24.8 ± 0.6 | 26.1 ± 1.0 | 29.8 ± 1.0 | 30.1 ± 0.3 |

It can clearly be seen from this comparison that in solvent-borne systems, a matting agent must be added to achieve a matt coating, while in aqueous systems, high hydroxy-functional acrylic resins develop a matt effect in combination with a curing agent, without the need to add a matting agent. As was expected, addition of matting agents leads to a marked dry film thickness dependence of the matt effect. If copolymerisable emulsifiers are used, in contrast to the commonly used emulsifiers which do not copolymerise with the acrylic monomers, the matt effect is also surprisingly independent on the layer thickness of the clearcoat film, and largely independent on the curing conditions. An aqueous acrylic copolymer dispersion made with the commonly used non-copolymerisable emulsifiers which are free from olefinically unsaturated groups within their molecules, shows a matt effect which increases with increasing dry film thickness, and also, depends on the curing conditions. It could not have been expected from the state of the art that acrylic copolymer dispersions prepared in the presence of copolymerisable emulsifiers, have a matt effect without addition of matting agent, independent on layer thickness and curing conditions.

The invention claimed is:

1. An aqueous coating composition comprising a dispersion of an acrylic copolymer A, a crosslinker B which is a multifunctional isocyanate B1, an aminoplast crosslinker B2 or a combination thereof, and water, wherein the acrylic copolymer A has moieties derived:
   from alkyl(meth)acrylates A1,
   from hydroxyalkyl(meth)acrylates A2,
   from olefinically unsaturated carboxylic acids A3 having from three to twelve carbon atoms,
   optionally, from further olefinically unsaturated monomers A4 selected from the group consisting of vinyl aromatics A41, vinyl ethers A42, vinyl halogenides A43, olefinically unsaturated amides A44 selected from the group consisting of acrylamide, methacrylamide, N-methyl (meth)acrylamide, N-vinyl-N-methyl acetamide, N-vinyl-N-methyl formamide, N-vinyl-N-methyl propionamide, N-vinyl-N-methyl butyramide, N-vinyl-N-methyl isobutyramide, corresponding homologues thereof having ethyl, n- and iso-propyl, n-butyl and tert.-butyl substituents on the nitrogen atom, and (meth-) acryloyloxyalkyl alkylene ureas, olefins A45, and vinyl esters A46, and
   mandatorily, from a copolymerisable emulsifier, which is an olefinically unsaturated surface-active molecule A5 which has at least one olefinic unsaturation, and at least one hydrophilic group which is a non-ionic oligo- or poly-oxyethylene or -oxypropylene group, or an acid or acid salt group which is a carboxylic, sulphonic or phosphonic acid or acid salt group, or a combination thereof,
   wherein mass fractions of moieties derived from said monomers A1 through A5 in the acrylic copolymer A are as follows: for A1, from 20% to 70%; for A2, from 20% to 70%; for A3, from 1.0% to 8.0%; for A4, from 0% to 25%; and for A5, from 0.1% to 10%, and wherein the acrylic copolymer A does not contain moieties derived from glycidyl-group containing (meth)acrylic monomers.

2. The aqueous coating composition of claim 1 formulated as a two-pack coating composition wherein the crosslinker B is an unblocked multifunctional isocyanate.

3. The aqueous coating composition of claim 1 formulated as a one-pack coating composition wherein the crosslinker B comprises at least one of a blocked multifunctional isocyanate B1', and an aminoplast crosslinker B2 which is an at least partially etherified adduct of a multifunctional amine, and an aldehyde.

4. The aqueous coating composition of claim 1 wherein the acrylic copolymer A has a hydroxyl number of from 70 mg/g to 250 mg/g.

5. The aqueous coating composition of claim 1 wherein the acrylic copolymer A is made by radically induced copolymerisation of monomers consisting of groups A1, A2, and A3, in the presence of at least one monomer of group A5, optionally in the presence of at least one monomer of group A4.

6. The aqueous coating composition of claim 1 wherein the monomers of group A1 are esters of acrylic or methacrylic acid with linear, branched or cyclic aliphatic alcohols having from one to thirty carbon atoms.

7. The aqueous coating composition of claim 1 wherein the monomers of group A2 are monoesters of dihydric aliphatic linear or branched or cyclic alcohols having from two to twenty carbon atoms, with acrylic or methacrylic acid, ethacrylic acid, and vinylacetic acid, crotonic acid, and isocrotonic acid, as well as maleic, fumaric, itaconic, mesaconic and citraconic acids.

8. The aqueous coating composition of claim 1 wherein at least one monomer of group A41 is used, and is selected from the group consisting of styrene, alpha-methyl styrene, 4-methyl styrene, the mixture of methyl styrene commercially available as "vinyl toluene", p-methoxystyrene, p-ethoxystyrene, 2-vinylpyridine, 4-vinylpyridine, 4-vinyl biphenyl, 2-vinylnaphthalene, and 9-vinylanthracene.

9. The aqueous coating composition of claim 1 wherein at least one monomer of group A42 is used, and is selected from the group consisting of vinyl methyl ether, vinyl ethyl ether, n-butyl vinyl ether, vinyl 2-ethylhexyl ether, octadecyl vinyl ether, and cyclohexyl vinyl ether.

10. The aqueous coating composition of claim 1 wherein at least one monomer of group A43 is used, and is selected from the group consisting of vinyl chloride, acrylonitrile and methacrylonitrile.

11. The aqueous coating composition of claim 1 wherein at least one monomer of group A44 is used, and is selected from the group consisting of N-vinyl-N-methyl acetamide, N-vinyl-N-methyl formamide, N-vinyl-N-methyl propionamide, N-vinyl-N-methyl butyramide, N-vinyl-N-methyl isobutyramide, corresponding homologues thereof having ethyl, n- and iso-propyl, n-butyl and tert.-butyl substituents on the nitrogen atom, and (meth)acryloyloxyalkyl alkylene ureas.

12. The aqueous coating composition of claim 1 wherein at least one monomer of group A45 is used, and is selected from the group consisting of ethylene, propylene, butene-1, hexene-1, and octene-1, and dienes such as butadiene, isoprene, and chloroprene.

13. A method of use of the aqueous coating compositions of claim 1 in the preparation of a coating film, comprising mixing a dispersion of an acrylic copolymer A, a crosslinker B which is a multifunctional isocyanate B1, or an aminoplast crosslinker B2 or a combination of both B1 and B2, and water, and optionally, additives, and applying the aqueous coating composition thus obtained on metal substrates, in multi-layer coatings, on wood, paper, and cardboard.

14. An aqueous coating composition comprising a dispersion of an acrylic copolymer A, a crosslinker B which is a multifunctional isocyanate B1, an aminoplast crosslinker B2 or a combination thereof, and water, wherein the acrylic copolymer A has moieties derived:
   from alkyl(meth)acrylates A1,
   from hydroxyalkyl(meth)acrylates A2,
   from olefinically unsaturated carboxylic acids A3 having from three to twelve carbon atoms,
   from further olefinically unsaturated monomers A4 selected from the group consisting of vinyl aromatics A41, vinyl ethers A42, vinyl halogenides A43, olefinically unsaturated amides A44 selected from the group consisting of acrylamide, methacrylamide, N-methyl (meth)acrylamide, N-vinyl-N-methyl acetamide, N-vinyl-N-methyl formamide, N-vinyl-N-methyl propionamide, N-vinyl-N-methyl butyramide, N-vinyl-N-methyl isobutyramide, corresponding homologues thereof having ethyl, n- and iso-propyl, n-butyl and tert.-butyl substituents on the nitrogen atom, and (meth-) acryloyloxyalkyl alkylene ureas, olefins A45, and vinyl esters A46, and
   from a copolymerisable emulsifier, which is an olefinically unsaturated surface-active molecule A5 which has at least one olefinic unsaturation, and at least one hydrophilic group which is a non-ionic oligo- or polyoxyethylene or -oxypropylene group, or an acid or acid salt group which is a carboxylic, sulphonic or phosphonic acid or acid salt group, or a combination thereof, wherein mass fractions of moieties derived from said monomers A1 through A5 in the acrylic copolymer A are as follows: for A1, from 20% to 70%; for A2, from 15% to 70%; for A3, from 1.0% to 8.0%; for A4, from 0% to 25%; and for A5, from 0.1% to 10% and wherein the acrylic copolymer A does not contain moieties derived from glycidyl-group containing (meth)acrylic monomers.

15. The aqueous coating composition of claim 14 wherein at least one monomer of group A41 is used, and is selected from the group consisting of styrene, alpha-methyl styrene, 4-methyl styrene, the mixture of methyl styrene commercially available as "vinyl toluene", p-methoxystyrene, p-ethoxystyrene, 2-vinylpyridine, 4-vinylpyridine, 4-vinyl biphenyl, 2-vinylnaphthalene, and 9-vinylanthracene.

16. The aqueous coating composition of claim 14 wherein at least one monomer of group A42 is used, and is selected from the group consisting of vinyl methyl ether, vinyl ethyl ether, n-butyl vinyl ether, vinyl 2-ethylhexyl ether, octadecyl vinyl ether, and cyclohexyl vinyl ether.

17. The aqueous coating composition of claim 14 wherein at least one monomer of group A43 is used, and is selected from the group consisting of vinyl chloride, acrylonitrile and methacrylonitrile.

18. The aqueous coating composition of claim 14 wherein at least one monomer of group A44 is used, and is selected from the group consisting of N-vinyl-N-methyl acetamide, N-vinyl-N-methyl formamide, N-vinyl-N-methyl propionamide, N-vinyl-N-methyl butyramide, N-vinyl-N-methyl isobutyramide, corresponding homologues thereof having ethyl, n- and iso-propyl, n-butyl and tert.-butyl substituents on the nitrogen atom, and (meth)acryloyloxyalkyl alkylene ureas.

19. The aqueous coating composition of claim 14 wherein at least one monomer of group A45 is used, and is selected from the group consisting of ethylene, propylene, butene-1, hexene-1, and octene-1, and dienes such as butadiene, isoprene, and chloroprene.

20. The aqueous coating composition of claim 6 wherein the linear, branched or cyclic aliphatic alcohols are selected from the group consisting of methanol, ethanol, n-propanol, isopropanol, n-butanol, sec. butanol, iso-butanol, and tert.-butanol, the isomeric amyl alcohols, 1-hexanol, 2-hexanol, 1-heptanol, 1-octanol, 2-ethyl-1-hexanol, stearylalcohol, cyclohexanol, 2-methyl-cyclohexanol, borneol, and isoborneol.

21. The aqueous coating composition of claim 1 wherein in the olefinically unsaturated surface-active molecule A5, the at least one olefinic unsaturation is a vinyl or allyl group, and the at least one hydrophilic group is a non-ionic moiety which is an oligoalkylene ether or polyalkylene polyether having ethylene or propylene or both moieties as alkylene groups, or an ionic moiety which is an acid group or an acid salt group derived from an organically bound carboxylic, sulphonic or phosphonic acid group, or a combination of the non-ionic and ionic hydrophilic moiety.

* * * * *